US009445048B1

(12) United States Patent
Nariyawala et al.

(10) Patent No.: US 9,445,048 B1
(45) Date of Patent: Sep. 13, 2016

(54) GESTURE-INITIATED ACTIONS IN VIDEOCONFERENCES

(71) Applicant: Google Inc., Mountain View, CA (US)

(72) Inventors: Mehul Nariyawala, Los Altos, CA (US); Rahul Garg, Mountain View, CA (US); Navneet Dalal, Palo Alto, CA (US); Thor Carpenter, Kirkland, WA (US); Greg Burgess, Redmond, WA (US); Tim Psiaki, Duvall, WA (US); Mark Chang, Seattle, WA (US); Antonio Bernardo Monteiro Costa, San Francisco, CA (US); Christian Plagemann, Palo Alto, CA (US); Chee Chew, Redmond, WA (US)

(73) Assignee: GOOGLE INC., Mountain View, CA (US)

( * ) Notice: Subject to any disclaimer, the term of this patent is extended or adjusted under 35 U.S.C. 154(b) by 2 days.

(21) Appl. No.: 14/445,778

(22) Filed: Jul. 29, 2014

(51) Int. Cl.
H04N 7/15 (2006.01)
G06F 3/01 (2006.01)

(52) U.S. Cl.
CPC .............. *H04N 7/15* (2013.01); *G06F 3/017* (2013.01)

(58) Field of Classification Search
None
See application file for complete search history.

(56) References Cited

U.S. PATENT DOCUMENTS

| 8,325,214 | B2 | 12/2012 | Hildreth | |
| 8,427,521 | B2 | 4/2013 | Aaron et al. | |
| 8,767,034 | B2 | 7/2014 | Setton | |
| 8,917,633 | B2* | 12/2014 | Smith | H04Q 3/0016 370/260 |
| 8,971,511 | B2* | 3/2015 | Shaffer | H04M 3/42187 379/202.01 |
| 9,256,748 | B1* | 2/2016 | Gates | G06F 21/60 |
| 2002/0101505 | A1* | 8/2002 | Gutta | H04N 7/15 348/14.07 |
| 2004/0047461 | A1* | 3/2004 | Weisman | H04M 3/42008 379/202.01 |
| 2008/0059578 | A1* | 3/2008 | Albertson | G06F 3/016 709/204 |
| 2008/0065998 | A1* | 3/2008 | Brown | H04M 3/56 715/755 |
| 2013/0104089 | A1 | 4/2013 | Rieffel et al. | |
| 2014/0198174 | A1* | 7/2014 | Sanso | H04N 7/15 348/14.08 |

FOREIGN PATENT DOCUMENTS

EP 2693746 A1 2/2014

* cited by examiner

Primary Examiner — Fan Tsang
Assistant Examiner — Jeffrey Lytle
(74) Attorney, Agent, or Firm — Lowenstein Sandler LLP

(57) ABSTRACT

Systems and methods are disclosed for gesture-initiated actions in videoconferences. In one implementation, a processing device receives one or more content streams as part of a communication session. The processing device identifies, within the one or more content streams, a request for feedback. The processing device processes, based on an identification of a request for feedback within the one of the plurality of content streams, the one or more content streams to identify a presence of one or more gestures within at least one of the one or more content streams. The processing device initiates, based on an identification of the presence of one or more gestures within at least one of the one or more content streams, an action with respect to the communication session.

20 Claims, 8 Drawing Sheets

GESTURE-INITIATED ACTIONS IN VIDEOCONFERENCES

TECHNICAL FIELD

Aspects and implementations of the present disclosure relate to data processing, and more specifically, to gesture-initiated actions in videoconferences.

BACKGROUND

Video collaborations over the Internet (e.g., videoconferences, telemedicine, etc.) are becoming increasingly common as broadband access and applications that take advantage of broadband connectivity proliferate. Applications for supporting video collaborations may be browser-based, or may run independently of a browser.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In an aspect of the present disclosure, a processing device receives one or more content streams as part of a communication session. The processing device identifies, within the one or more content streams, a request for feedback. The processing device processes, based on an identification of a request for feedback within the one of the plurality of content streams, the one or more content streams to identify a presence of one or more gestures within at least one of the one or more content streams. The processing device initiates, based on an identification of the presence of one or more gestures within at least one of the one or more content streams, an action with respect to the communication session.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure are directed to gesture-initiated actions in videoconferences. The systems and methods disclosed can be applied to media collaborations (e.g., audio and/or videoconferences, audio and/or video chat, audio and/or videoconference rooms, audio and/or video chat rooms, etc.) in which content/media streams (e.g., live audio and/or video content, recorded audio and/or video content, etc.) that are transmitted by devices of one or more participants/users are combined into a composite content/media stream. More particularly, though existing videoconference technologies do enable participants to view the video streams provided by other participants in the videoconference, such streams are often arranged (e.g., within a single interface) such that a single user (e.g., the primary presenter or current speaker) is allocated a relatively larger or more prominent portion of the interface. As a result, while the remaining participants in the videoconference may be able to better focus on such a primary presenter/speaker, such remaining participants (who are allocated relatively smaller portions of the videoconference interface) are often precluded from providing meaningful feedback during the course of a videoconference. This is further underscored by the fact that many videoconference technologies limit/restrict the ability to transmit audio to the primary presenter (in order to prevent other participants from drowning out the voice of the primary presenter).

Accordingly, described herein in various embodiments are technologies that enable gesture-initiated actions in videoconferences. For example, as described herein, during the course of a videoconference, a request for feedback (such as may be initiated by one of the participants) can be identified (e.g., using speech-to-text processing techniques). Such a request may, for example, inquire as to the opinions or views of the other participants in the videoconference, such as with respect to a particular topic or issue. Upon identifying such a request, one or more of the content/media streams that make up the videoconference can be processed (e.g., using gesture recognition techniques) in order to identify the presence of one or more gestures (e.g., thumbs up, thumbs down, etc.) within such streams. Upon identifying such gesture(s), one or more actions can be initiated with respect to the videoconference (e.g., selecting a new participant as the primary presenter/speaker of the videoconference). In doing so, multiple participants in the videoconference can provide meaningful input and feedback (despite not being the primary presenter/speaker), and can do so in an intuitive manner (e.g., using hand gestures within their respective video stream).

Figure 1:
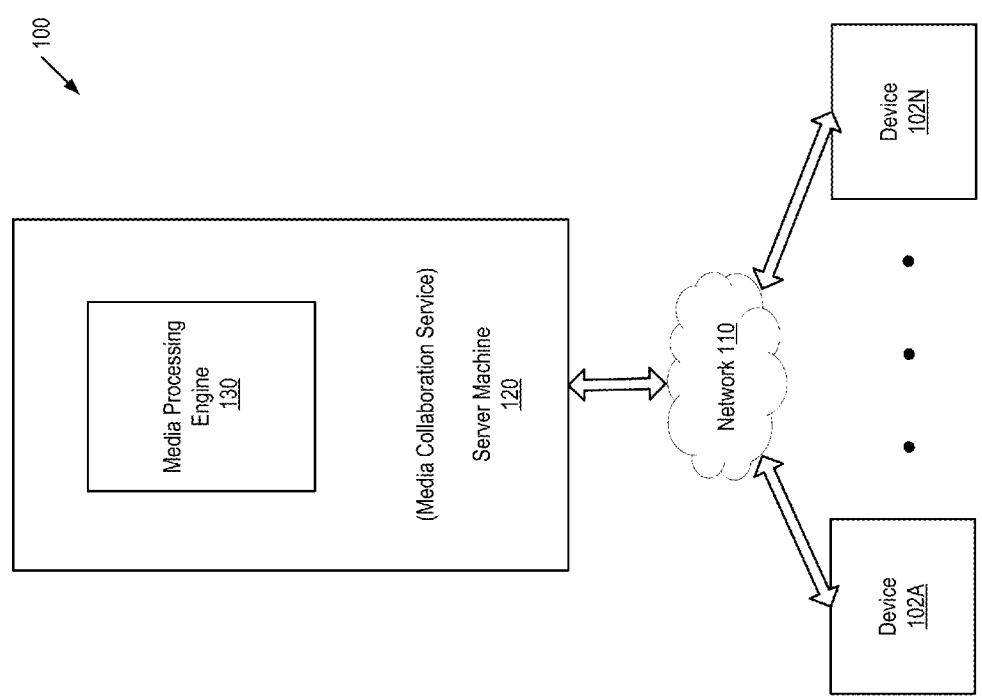
FIG. 1 depicts an illustrative system architecture, in accordance with one implementation of the present disclosure.

FIG. 1 depicts an illustrative system architecture 100, in accordance with one implementation of the present disclosure. The system architecture 100 includes user devices 102A-102N and server machine 120. These various elements or components can be connected to one another via network 110, which can be a public network (e.g., the Internet), a private network (e.g., a local area network (LAN) or wide area network (WAN)), or a combination thereof.

User devices 102A-102N can be wireless terminals (e.g., smartphones, etc.), personal computers (PC), laptops, tablet computers, or any other computing or communication devices. The user devices 102A-102N may run an operating system (OS) that manages hardware and software of the user devices 102A-102N. Various applications, such as mobile applications ('apps'), web browsers, etc. (not shown) may run on the user devices (e.g., on the OS of the user devices). Such applications can, for example, enable a user to capture media content (e.g., an audio clip/stream, a video clip/stream, etc.), provide media content (e.g., upload media content or a content/media stream to a central server and/or transmit it to another user), receive media content/stream (e.g., via network 110), participate in a videoconference, and/or view, display, or otherwise present or consume media content (e.g., play a video/video stream, listen to a song/audio stream, etc.), such as via the user device 102. The user devices 102A-102N can be geographically distributed anywhere throughout the world.

Server machine 120 can be a rackmount server, a router computer, a personal computer, a portable digital assistant, a mobile phone, a laptop computer, a tablet computer, a camera, a video camera, a netbook, a desktop computer, a media center, any combination of the above, or any other such computing device capable of implementing the various features described herein. In certain implementations, server machine 120 can enable media collaboration services such as audio and/or videoconferences (e.g., among the users of devices 102A-N) using, for example, streaming video or voice over IP (VoIP) technologies and may be used for personal, entertainment, business, educational or academically oriented interactions. Server machine 120 may be dedicated to providing video conferencing services or may provide video conferencing services along with other services including, for example, news services, social networking services and/or content hosting services. For instance, the server 120 may allow a user to view a video clip or a news article and start a videoconference while viewing the video clip or the news article. In another example, the server 120 may allow a user to start a videoconference while visiting a social networking site or video content hosting site.

Server machine 120 can also include components such as media processing engine 130. The components can be combined together or separated in further components, according to a particular implementation. It should be noted that in some implementations, various components of server machine 120 may run on separate machines. Moreover, some operations of certain of the components, such as media processing engine 130, are described in more detail below with respect to FIGS. 2-7B.

It should be understood that though FIG. 1 depicts server machine(s) 120 and device(s) 102 as being discrete components, in various implementations any number of such components (and/or elements/functions thereof) can be combined, such as within a single component/system.

Figure 2:
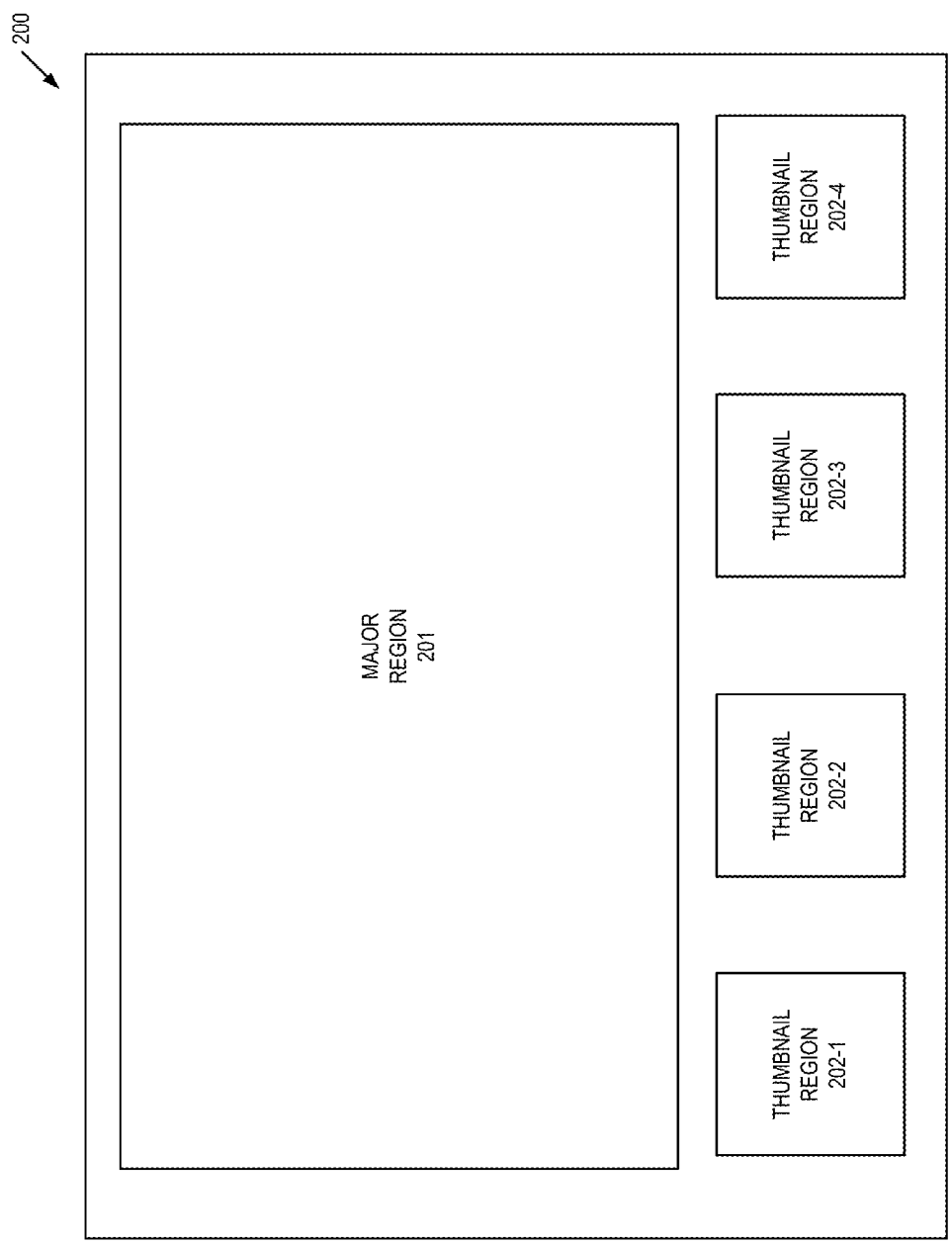
FIG. 2 depicts an exemplary interface of a media collaboration service/application in accordance with one implementation of the present disclosure.

FIG. 2 depicts an illustrative screen/interface 200 of a composite audio/video stream associated with an audio/video collaboration (e.g., a videoconference), such as may be generated/provided by server machine 120 to one or more user devices 102, in accordance with one implementation of the present disclosure. As shown in FIG. 2, screen 200 comprises one major region 201 and four thumbnail regions 202-1 through 202-4, where each of the referenced regions is associated with a respective participant/user. In certain implementations, each region can contain, depict, or otherwise present media content (e.g., video content) provided by a particular participant in a media collaboration. Thus, for example, the major region 201 may contain a video stream transmitted by a first participant, (e.g., a "room" of the first or primary participants in a videoconference, video clips shared by the first participant, etc.), while each of the thumbnail regions may contain a miniaturized version of a video stream transmitted by another participant, or simply a static image (e.g., an avatar, etc.) associated with the participant or video stream. In one implementation, a thumbnail region may transform or transition into a major region (e.g., in response to a participant selecting/clicking on the thumbnail region or otherwise activating the thumbnail region), and vice versa. It should be noted that although the regions of screen 200 are depicted as rectangular, one or more of the regions may have some other shape (e.g., a circle, a trapezoid, etc.). Moreover, in certain implementations a particular region can change (e.g., from a thumbnail region to a major region) depending on whether the participant associated with the region is speaking or not. Such a change can be done automatically (e.g., without receiving any user request or detecting any user interaction).

Moreover, one or more participants in an audio/video (audio and/or video) collaboration can provide/project audio content (e.g., the spoken voice of the participant, music, etc.) which, upon being received/perceived by a user device, can be transmitted or otherwise provided by the user device as an audio stream (not shown) that can be incorporated into an audio/video collaboration. In certain implementations, such audio streams can be provided independent of a video stream (e.g., a participant providing audio-only input during an audio/video collaboration), while in other implementations such audio streams can be provided in conjunction with a video stream (e.g., a combined stream, incorporating synchronized video and audio of a participant talking).

In accordance with one implementation, server machine 120 combines the individual audio and/or video streams into a composite stream and embeds metadata within the composite stream that specifies geometric properties of the regions corresponding to the video streams as well as a region/participant mapping (an association between a user/participant and a region).

As described herein, multiple content streams (e.g., video streams) can be received by server machine 120 from various user devices 102, and a composite content/media stream can be generated and provided to the various participants in a communication session (e.g., a videoconference). Such a composite content/media stream can arrange the various content streams in different presented regions, such that a user/participant in the videoconference can simultaneously view some or all of the content streams within a single interface/screen. During the course of such a videoconference, a request for feedback (such as may be initiated by one of the participants) can be identified (e.g., using speech-to-text processing techniques). Such a request may, for example, inquire as to the opinions or views of the other participants in the videoconference, such as with respect to a particular topic or issue. Upon identifying such a request, one or more of the content streams that make up the videoconference can be processed (e.g., using gesture recognition techniques) in order to identify the presence of one or more gestures indicating participant feedback, such as approval, disapproval, etc. (e.g., thumbs up, thumbs down, hand raising, etc.) within such streams. Upon identifying such gesture(s), one or more actions can be initiated with respect to the videoconference (e.g., selecting a new participant as the primary presenter/speaker of the videoconference). In certain implementations, such operations can be performed by and/or in conjunction with media processing engine 130.

Figure 3:
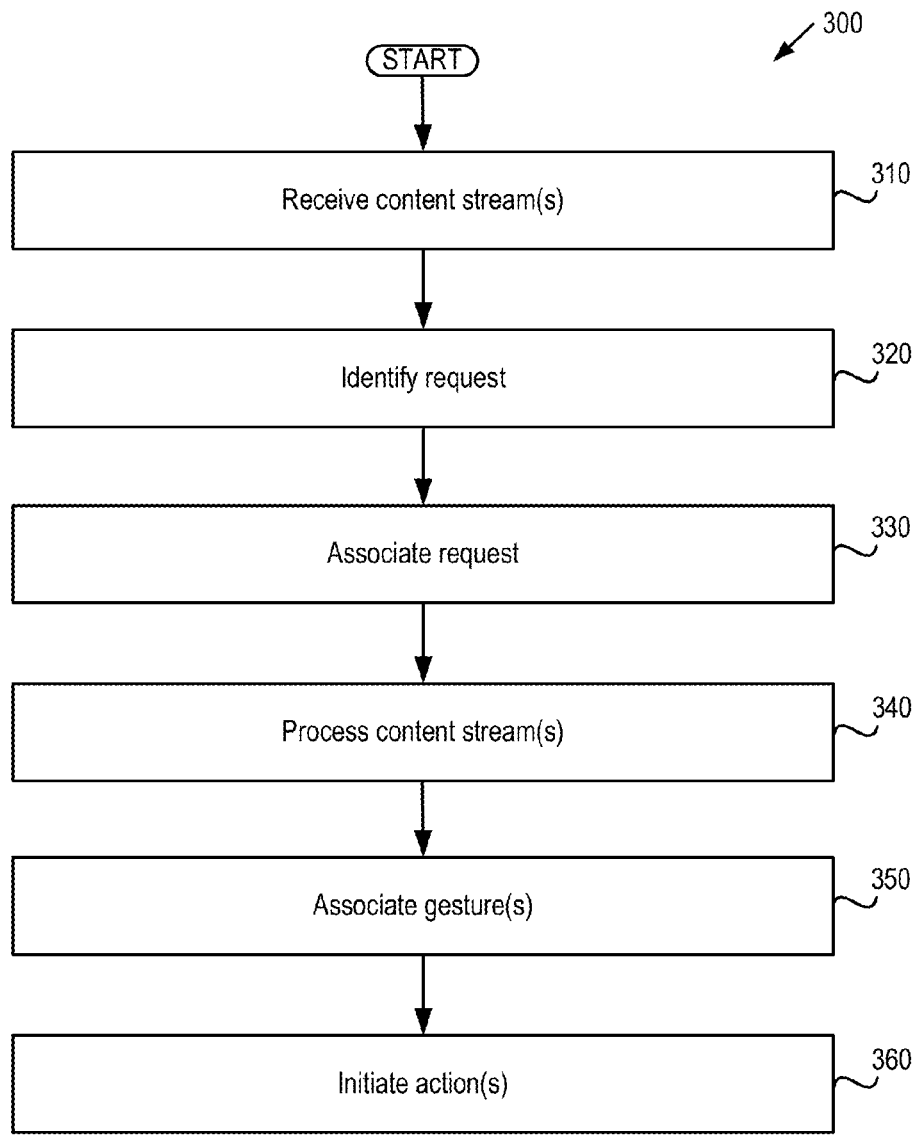
FIG. 3 depicts a flow diagram of aspects of a method for gesture-initiated actions in videoconferences.

FIG. 3 depicts a flow diagram of aspects of a method 300 for gesture-initiated actions in videoconferences. The method is performed by processing logic that may comprise hardware (circuitry, dedicated logic, etc.), software (such as is run on a general purpose computer system or a dedicated machine), or a combination of both. In one implementation, the method is performed by server machine 120 of FIG. 1, while in some other implementations one or more blocks of FIG. 3 may be performed by another machine. For example, in various alternative implementations, the method can be performed by/at user device(s) 102.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 310, one or more content streams can be received. Examples of such content streams include but are not limited to video streams and audio streams. In certain implementations, such content streams can be captured at user device(s) 102 (e.g., using embedded or peripheral media capture devices, such as video cameras, webcams, etc.) and transmitted by the user device(s) (e.g., via network 110) such that they can be received by server machine 120 as part of a communication session (e.g. a videoconference). In one aspect, block 310 is performed by media processing engine 130.

At block 320, a request can be identified. Such a request can be, for example, a request for feedback. In certain implementations, such a request can be identified within one or more content streams (such as the content streams received at block 310). Moreover, in certain implementations such a request can be identified by continuously and/or intermittently processing audio content within one or more content streams (such as the content streams received at block 310), such as using speech-to-text processing techniques. In doing so, a request for feedback can be identified. In one aspect, block 320 is performed by media processing engine 130.

Figure 4B:
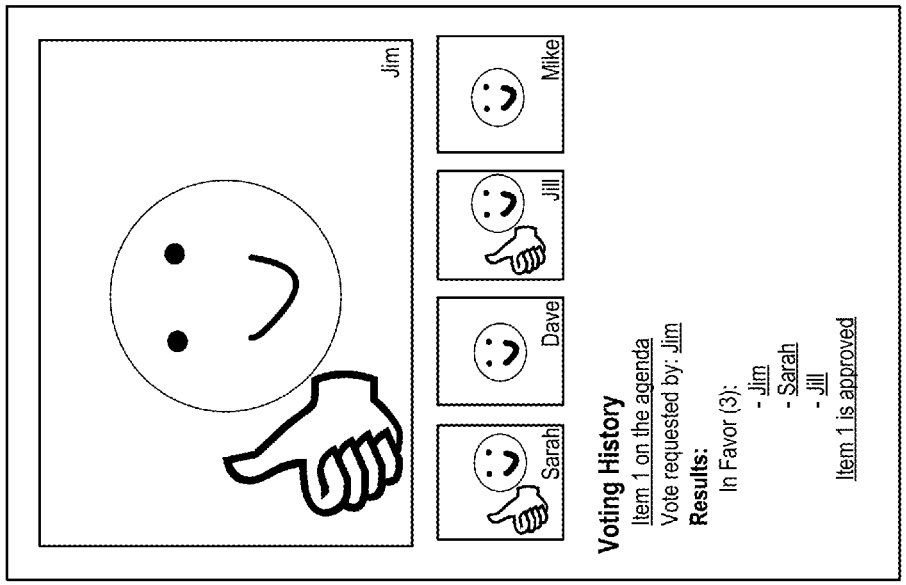
FIG. 4B depicts an exemplary content presentation interface, in accordance with one implementation of the present disclosure.
Figure 4A:
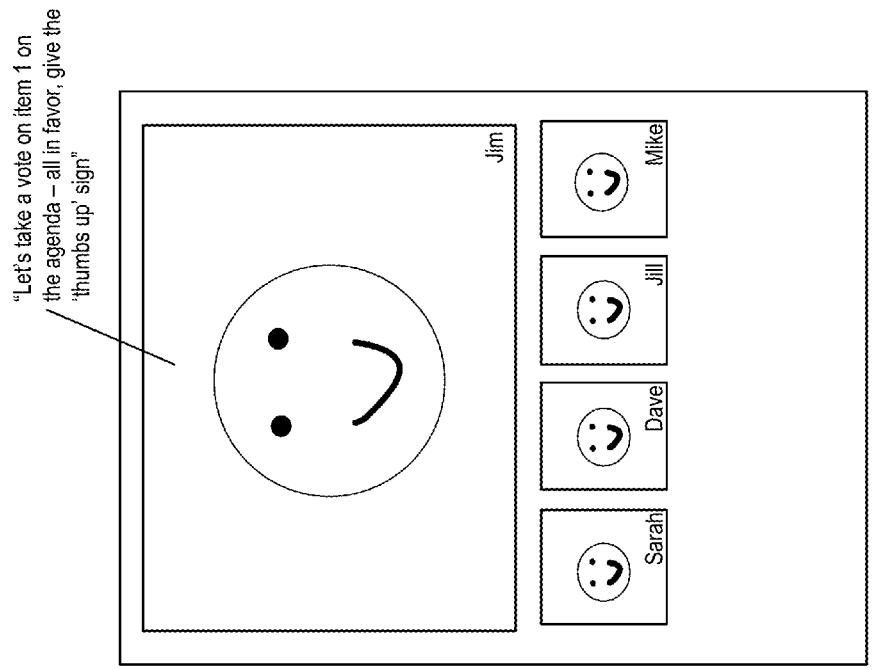
FIG. 4A depicts an exemplary content presentation interface, in accordance with one implementation of the present disclosure.

For example, FIG. 4A depicts an exemplary interface of a videoconferencing service/application. As shown in FIG. 4A and described herein, content (e.g., video streams) provided by various users/participants in the videoconference (e.g., 'Jim,' 'Sarah,' 'Dave,' etc., as shown) can be arranged in various regions of the interface. As is also depicted in FIG. 4A, a request for feedback (e.g., audio corresponding to "Let's take a vote . . . ," as shown) can be identified within a particular content stream.

At block 330, a request for feedback (such as is identified at block 320) can be associated with a user. Such a user can be, for example, associated with a particular content stream (such as a content stream received at block 310). For example, as depicted in FIG. 4A, being that the referenced request ("Let's take a vote . . . ") can be identified as originating from the content stream provided by 'Jim,' the identified request can be further associated with such a user (here, 'Jim'). In doing so, a history/log can be created and/or maintained (as will be described in greater detail with respect to FIG. 4B), and such a log can reflect which user initiated the request for feedback (as shown in FIG. 4B: "Vote requested by: Jim"). In one aspect, block 330 is performed by media processing engine 130.

At block 340, one or more content streams (such as those received at block 310) can be processed. In certain implementations, such content streams can be continuously and/or intermittently processed (e.g., using one or more gesture recognition technologies) to identify the presence of one or more gestures within one or more of the content streams. Moreover, in certain implementations such content streams can be processed based on/in response to an identification of a request (e.g., a request for feedback) within the one of the plurality of content streams (such as can be identified at block 320). In one aspect, block 340 is performed by media processing engine 130.

For example, FIG. 4B depicts an exemplary interface of a videoconferencing service/application. As shown in FIG. 4B, several of the participants in a videoconference (the same videoconference as depicted in FIG. 4A) can be determined to be indicating a 'thumbs up' gesture (here, 'Jim', 'Sarah,' and 'Jill').

Additionally, in certain implementations one or more of the content streams (such as those received at block 310) can be processed to identify the presence of such gesture(s) within a defined chronological interval of the identification of the request for feedback (e.g., as identified at block 320). For example, upon identifying a request for feedback (e.g., audio content such as "Let's take a vote . . . ," such as is depicted in FIG. 4A), those gestures determined to have been provided/received within a certain timeframe or interval of such a request (e.g., within 10 seconds of the request) can be determined to have been provided in response to the request. In doing so, those gestures which are likely to have been intended (e.g., by the respective participants) as responses to the request can be properly identified as such, while other gestures which are relatively unlikely to have been intended as responses to the request (e.g., a 'thumbs up' gesture provided by a user 20 minutes after the request) will not be identified as such.

Moreover, in certain implementations the referenced gesture(s) can be processed to determine a feedback result. Such a feedback result can be, for example, a determination that one type of gesture is relatively more prevalent across the various content streams than one or more other gestures (for example, that such a gesture is present in a majority of the content streams that make up a particular videoconference, or is present in relatively more of the content streams in a videoconference than are one or more other gestures). For example, as depicted in FIG. 4B, it can be determined that three of the participants in the videoconference ('Jim,' 'Sarah,' and 'Jill') have provided the 'thumbs up' gesture in response to the request depicted in FIG. 4A ("Let's take a vote . . . "). As such, it can be further determined that the 'thumbs up' gesture (indicating an approval of or agreement with the request) is provided by a majority of the participants in the videoconference (three participants, as opposed to the two participants—'Dave' and 'Mike'—who cannot be determined to be providing the 'thumbs up gesture,' either by virtue of providing no gesture, or, alternatively, by providing another gesture, such as 'thumbs down').

Additionally, as is depicted in FIG. 4B, the referenced interface can be annotated in order to reflect the responses provided by the various participants (e.g., with respect to a particular request). As shown in FIG. 4B, a 'voting history' can be maintained which can reflect, for example, the particular nature of the query (e.g., 'Item 1 on the agenda,' as can be determined, for example, using speech-to-text techniques), the participant that initiated the request ('Jim'), as well as the results of the responses/feedback provided by the various participants (e.g., a record of how each participant voted, as shown). Additionally, in scenarios in which an outcome can be identified (e.g., when a majority of users have voted in a particular manner), such an outcome can also be indicated (e.g., 'Item 1 is approved,' as shown), and maintained within a history/log associated with the communication session.

At block 350, one of the gestures (e.g., a gesture identified at block 340) can be associated with a user, such as a user associated with the content stream within which the referenced gesture is identified (such as a content stream received at block 310). For example, as depicted in FIG. 4B, having identified that a particular gesture (e.g., a 'thumbs up' gesture) is present within the content stream provided by a particular user (e.g., 'Sarah'), corresponding to a response/feedback provided by that user with respect to a particular request (e.g., as depicted in FIG. 4A), such a response/feedback can be further associated with such a user (e.g., in a history or log associated with the referenced user). For example, having identified the presence of a particular gesture (e.g., 'thumbs up') within a content stream provided by a particular user (e.g., 'Sarah'), corresponding to that user's response to a particular request (e.g., 'a vote on Item 1 on the agenda'), a record of such a response can be associated with the referenced user. In doing so, subsequent determinations, predictions, etc., can be made based on such a response (e.g., a prediction as to how the user might vote with respect to related items/requests, identification of related products or information that may be of interest to the user, etc.). In one aspect, block 350 is performed by media processing engine 130.

It should be noted that in situations in which the systems discussed herein collect personal information about users, or may make use of personal information, the users may be provided with an opportunity to control whether programs or features collect user information (e.g., information about a user's media viewing history, interests, a user's preferences, or a user's current location), or to control whether and/or how to receive content that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

At block 360, an action can be initiated. Such an action can be initiated, for example, with respect to a communication session (such as the communication session that the referenced content streams are part of). In certain implementations, such an action can be initiated based on an identification of the presence of one or more gestures within one or more content streams (as identified, for example, at block 340). In one aspect, block 360 is performed by media processing engine 130.

For example, as depicted in FIG. 4B and described herein, upon identifying, in response to a request for a vote, the presence of a particular gesture (e.g., 'thumbs up') across a majority of the participants in a videoconference, the outcome of such a vote can be determined (e.g., approving a proposal), and such an outcome can be recorded (e.g., in a history associated with the videoconference) and one or more additional actions can also be initiated (e.g., notifying other interested parties of the result, etc.).

Figure 5B:
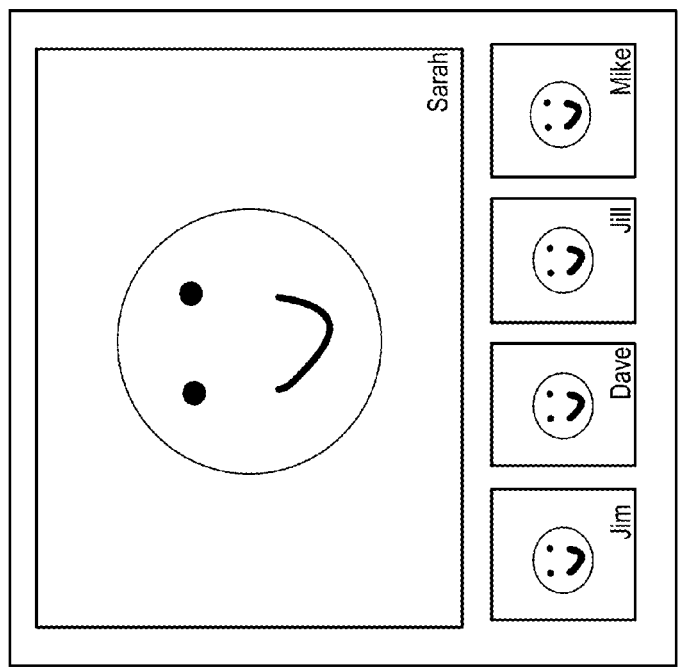
FIG. 5B depicts an exemplary content presentation interface, in accordance with one implementation of the present disclosure.
Figure 5A:
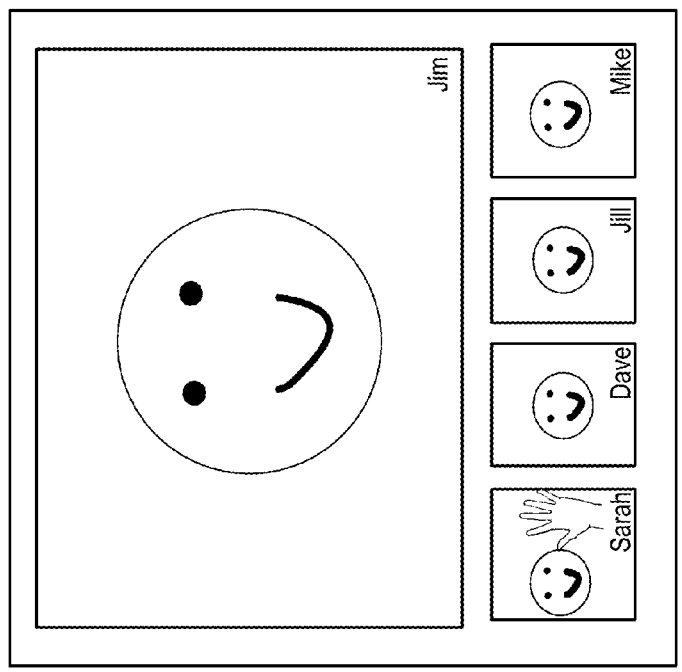
FIG. 5A depicts an exemplary content presentation interface, in accordance with one implementation of the present disclosure.

Moreover, in certain implementations, initiating the referenced action can include selecting one of the content streams as associated with and/or to be presented as a primary presenter. For example, FIG. 5A depicts an exemplary interface of a videoconferencing service/application. It can be appreciated that while the video stream provided by each participant ('Jim,' 'Sarah,' 'Dave,' etc.) may be viewable by the other users (such as via the depicted interface), it may be advantageous to restrict or limit the ability to transmit audio to a single user (e.g., a primary presenter, such as 'Jim' in FIG. 5A), in order to ensure that the voices of multiple users do not drown one another out. Accordingly, in certain implementations, a 'hand raise' gesture can be utilized by various users to indicate that they wish to assume the role of the primary presenter (e.g., in order to enable other participants in the videoconference to hear them). Thus, as shown in FIG. 5A, though 'Jim' is presently the primary presenter, upon identifying a 'hand raise' gesture within the content stream associated with 'Sarah,' 'Sarah' can be selected as the primary presenter in lieu of 'Jim' (as depicted in FIG. 5B).

Figure 6B:
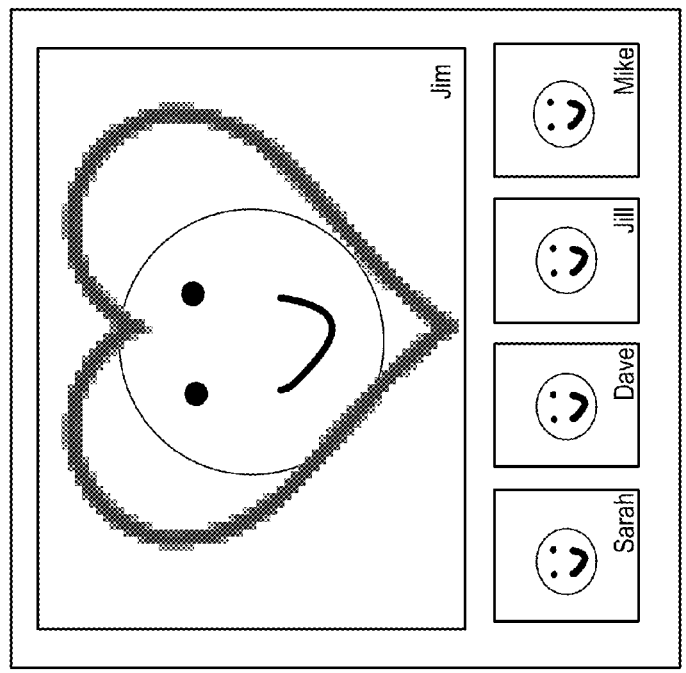
FIG. 6B depicts an exemplary content presentation interface, in accordance with one implementation of the present disclosure.
Figure 6A:
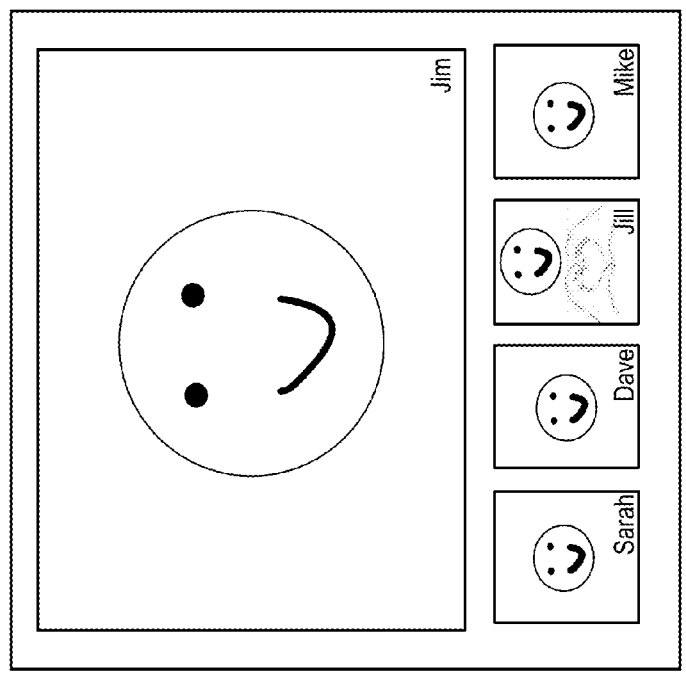
FIG. 6A depicts an exemplary content presentation interface, in accordance with one implementation of the present disclosure.

Additionally, in certain implementations, initiating the referenced action can include presenting a content item with respect to one of the content streams. For example, FIG. 6A depicts an exemplary interface of a videoconferencing service/application. It can be appreciated that it may be advantageous in certain scenarios to enable participants (e.g., users other than the primary presenter—here, 'Jim') to provide feedback to the primary presenter (e.g., indicating agreement with or approval of what the primary presenter is saying). Accordingly, in certain implementations, a 'hand heart' gesture can be utilized by various users to indicate their agreement with or approval of what the primary presenter is saying (e.g., such that other users may be made aware of such feedback while also not interrupting the audio which is being transmitted from the primary presenter). Thus, as shown in FIG. 6A, while 'Jim' is the primary presenter (and thus the other participants may only be capable of receiving audio from him), upon identifying a 'hand heart' gesture within the content stream associated with 'Jill,' a graphical overlay of a heart can be superimposed over the video stream associated with Jim (e.g., for a defined period of time, e.g., five seconds) (as depicted in FIG. 6B), thereby visually conveying such approval/agreement to the other participants.

Figure 7A:
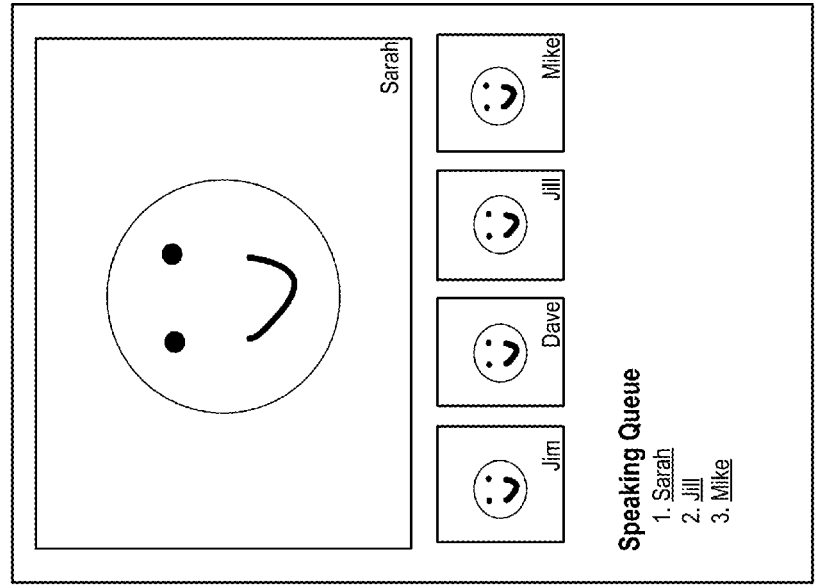
FIG. 7A depicts an exemplary content presentation interface, in accordance with one implementation of the present disclosure.
Figure 7B:
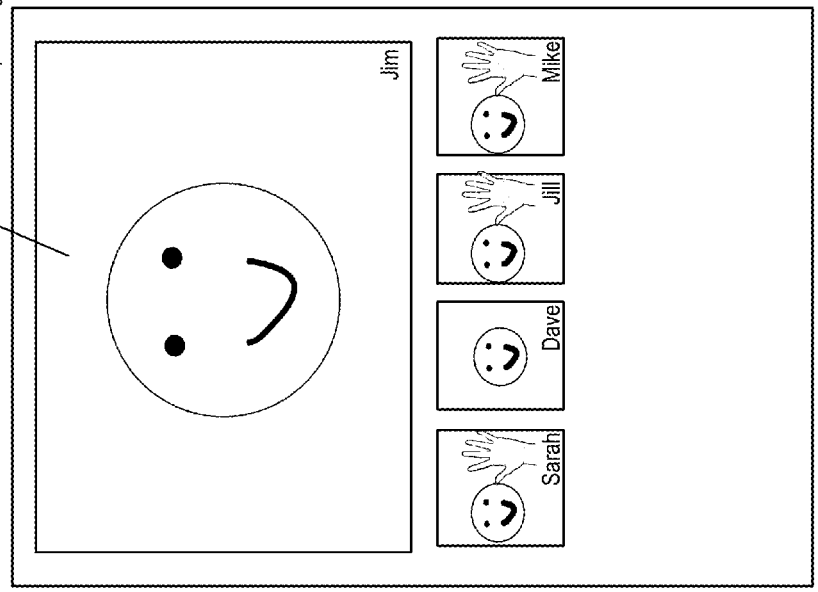
FIG. 7B depicts an exemplary content presentation interface, in accordance with one implementation of the present disclosure.

Moreover, in certain implementations, initiating the referenced action can include establishing a presentation queue with respect to one or more of the content streams. For example, FIG. 7A depicts an exemplary interface of a videoconferencing service/application. It can be appreciated that in certain scenarios multiple participants may wish to assume the role of the primary presenter (e.g., in order to share their thoughts, views, etc., with the other participants). Accordingly, in certain implementations, a request/inquiry can be made (e.g., by the primary presenter—here, 'Jim') as to whether other users wish to assume the role of the primary presenter ("Does anyone have anything to add . . . "). Upon identifying a 'raised hand' gesture being provided by various participants in response to such a request (e.g., 'Sarah,' 'Jill,' and 'Mike,' as shown in FIG. 7A), indicating that such users wish to assume the role of the primary presenter, a presentation queue ('Speaking Queue' as depicted in FIG. 7B) can be established. Such a presentation queue can list the participants that have indicated that they wish to assume the role of the primary presenter, and can reflect the order in which such participants will assume this role. It certain implementations a participant may maintain the role of the primary presenter until it can be determined that the user is likely to have completed their presentation (e.g., by determining that the user has not spoken for a defined period of time, at which point the next participant in the queue can be selected as the primary presenter), while in other implementations each presenter can be allotted a defined period of time (e.g., two minutes), upon expiration of which the next participant in the queue is to be selected as the primary presenter. In doing so, participants in a videoconference can efficiently and intuitively (e.g., using the referenced gestures) establish a presentation queue in order to improve the manner in which such videoconferences are conducted.

Figure 8:
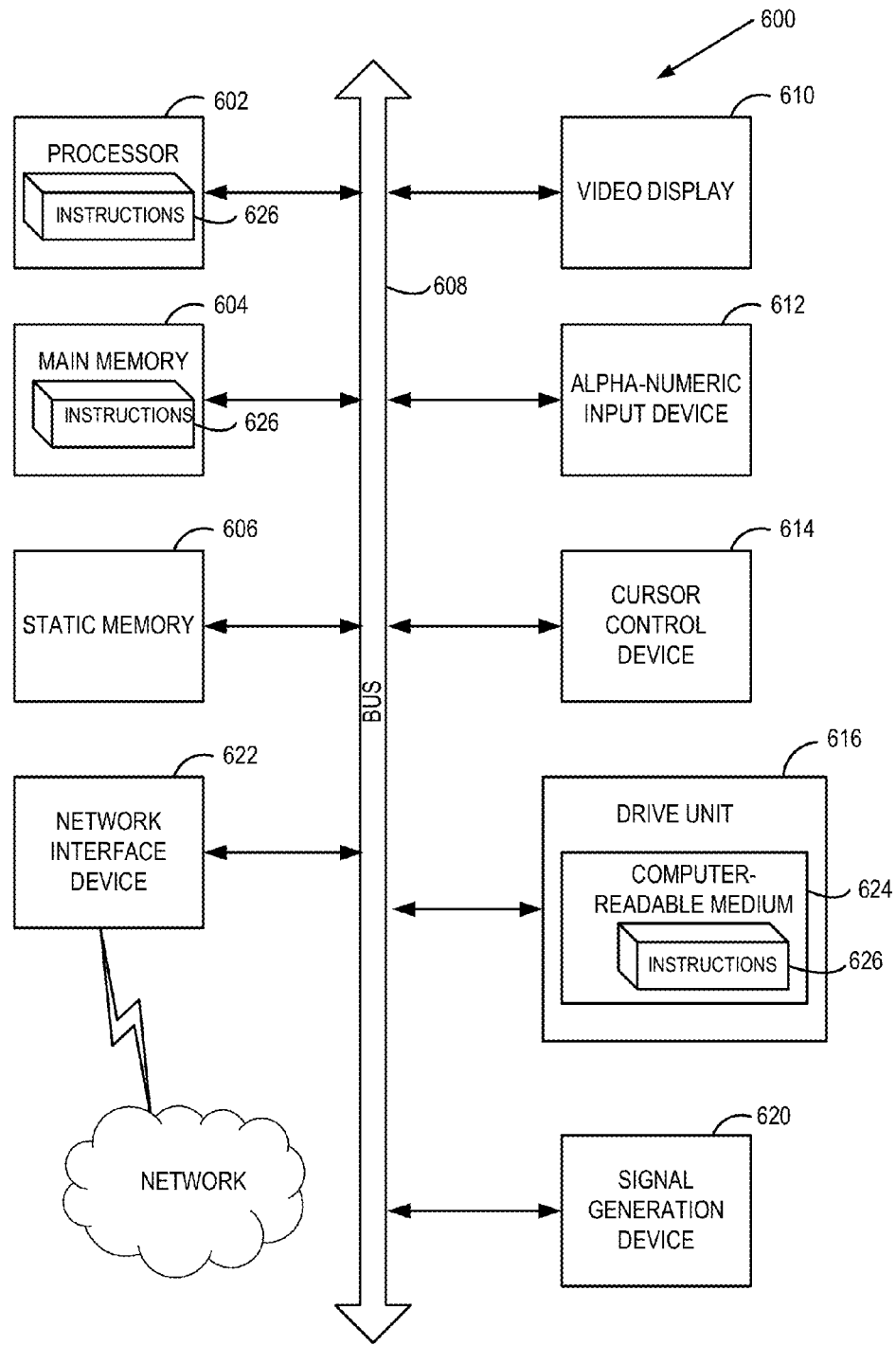
FIG. 8 depicts a block diagram of an illustrative computer system operating in accordance with aspects and implementations of the present disclosure.

FIG. 8 depicts an illustrative computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 600 includes a processing system (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, or a processor implementing other instruction sets or a processor implementing a combination of instruction sets. The processor 602 may also be one or more special-purpose processing devices such as an application specific integrated circuit (ASIC), a field programmable gate array (FPGA), a digital signal processor (DSP), network processor, or the like. The processor 602 is configured to execute instructions 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable medium 624 on which is stored one or more sets of instructions 626 (e.g., instructions executed by collaboration manager 225, etc.) embodying any one or more of the methodologies or functions described herein. Instructions 626 may also reside, completely or at least partially, within the main memory 604 and/or within the processor 602 during execution thereof by the computer system 600, the main memory 604 and the processor 602 also constituting computer-readable media. Instructions 626 may further be transmitted or received over a network via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "identifying," "processing," "initiating," "associating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Aspects and implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Moreover, the techniques described above could be applied to other types of data instead of, or in addition to, media clips (e.g., images, audio clips, textual documents, web pages, etc.). The scope of the disclosure should, therefore, be determined with reference to the appended claims, along with the full scope of equivalents to which such claims are entitled.

What is claimed is:

1. A non-transitory computer readable medium having instructions stored thereon that, when executed by a processing device, cause the processing device to:
   receive a plurality of content streams as part of a communication session;
   identify, within audio content contained within one of the plurality of content streams, a request for feedback;
   based on an identification of the request for feedback within the one of the plurality of content streams, process, by the processing device, the plurality of content streams to identify, within a defined chronological interval of the identification of the request for feedback, a presence of one or more gestures within video content contained within at least one of the plurality of content streams; and
   based on a determination that a first gesture of the one or more gestures is relatively more prevalent across the plurality of content streams than one or more other gestures, initiate an action with respect to the communication session.

2. The non-transitory computer readable medium of claim 1, wherein the instructions, when executed by the processing device, further cause the processing device to associate the request for feedback with a first user, the first user being associated with the one of the plurality of content streams.

3. The non-transitory computer readable medium of claim 1, wherein the instructions, when executed by the processing device, further cause the processing device to associate a respective one of the one or more gestures with a user associated with a respective one of the plurality of content streams within which the respective one of the one or more gestures is identified.

4. The non-transitory computer readable medium of claim 1, wherein to process the plurality of content streams is to process the one or more gestures to determine a feedback result.

5. The non-transitory computer readable medium of claim 1, wherein to initiate an action with respect to the communication session is to select one of the plurality of content streams as a primary presenter.

6. The non-transitory computer readable medium of claim 1, wherein to initiate an action with respect to the communication session is to present a content item with respect to one of the plurality of content streams.

7. The non-transitory computer readable medium of claim 1, wherein to initiate an action with respect to the communication session is to establish a presentation queue with respect to one or more of the plurality of content streams.

8. A method comprising:
   receiving a plurality of content streams as part of a communication session;
   identifying, within audio content contained within one of the plurality of content streams, a request for feedback;
   based on an identification of a request for feedback within the one of the plurality of content streams, processing, by a processing device, the plurality of content streams to identify, within a defined chronological interval of the identification of the request for feedback, a presence of one or more gestures within video content contained within at least one of the plurality of content streams; and
   based on an identification of the presence a determination that a first gesture of the one or more gestures within at least one of is relatively more prevalent across the plurality of content streams than one or more other gestures, initiating an action with respect to the communication session.

9. The method of claim 8, further comprising associating the request for feedback with a first user, the first user being associated with the one of the plurality of content streams.

10. The method of claim 8, further comprising associating a respective one of the one or more gestures with a user associated with a respective one of the plurality of content streams within which the respective one of the one or more gestures is identified.

11. The method of claim 8, wherein processing the plurality of content streams comprises processing the one or more gestures to determine a feedback result.

12. The method of claim 8, wherein initiating an action with respect to the communication session comprises selecting one of the plurality of content streams as a primary presenter.

13. The method of claim 8, wherein initiating an action with respect to the communication session comprises presenting a content item with respect to one of the plurality of content streams.

14. The method of claim 8, wherein initiating an action with respect to the communication session comprises establishing a presentation queue with respect to one or more of the plurality of content streams.

15. A system comprising:
a memory; and
a processing device, operatively coupled to the memory, to:
receive a plurality of content streams as part of a communication session;
identify, within audio content contained within one of the plurality of content streams, a request for feedback;
process, based on an identification of a request for feedback within the one of the plurality of content streams, the plurality of content streams to identify, within a defined chronological interval of the identification of the request for feedback, a presence of one or more gestures within video content contained within at least one of the plurality of content streams; and
initiate, based on an identification of the presence a determination that a first gesture of the one or more gestures within at least one of is relatively more prevalent across the plurality of content streams than one or more other gestures, an action with respect to the communication session.

16. The system of claim 15, wherein the processing device is further to associate the request for feedback with a first user, the first user being associated with the one of the plurality of content streams.

17. The system of claim 15, wherein the processing device is further to associate a respective one of the one or more gestures with a user associated with a respective one of the plurality of content streams within which the respective one of the one or more gestures is identified.

18. The system of claim 15, wherein to process the plurality of content streams is to process the one or more gestures to determine a feedback result.

19. The system of claim 15, wherein to initiate an action with respect to the communication session is to select one of the plurality of content streams as a primary presenter.

20. The system of claim 15, wherein to initiate an action with respect to the communication session is to establish a presentation queue with respect to one or more of the plurality of content streams.

\* \* \* \* \*